(12) United States Patent
Tanaka (10) Patent No.: US 10,606,242 B2
(45) Date of Patent: Mar. 31, 2020

(54) PRINT DATA DIVISION APPARATUS AND PROGRAM

(71) Applicant: CANON KABUSHIKI KAISHA, Tokyo (JP)

(72) Inventor: Shuya Tanaka, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 602 days.

(21) Appl. No.: 15/062,519

(22) Filed: Mar. 7, 2016

(65) Prior Publication Data

US 2016/0263835 A1    Sep. 15, 2016

(30) Foreign Application Priority Data

Mar. 12, 2015   (JP) ................................ 2015-049544
Sep. 29, 2015   (JP) ................................ 2015-191356

(51) Int. Cl.
*H04N 1/00*     (2006.01)
*G05B 19/4099*  (2006.01)

(52) U.S. Cl.
CPC ..... *G05B 19/4099* (2013.01); *H04N 1/00827* (2013.01); *G05B 2219/35134* (2013.01); *G05B 2219/49007* (2013.01); *G05B 2219/49023* (2013.01)

(58) Field of Classification Search
None
See application file for complete search history.

(56) References Cited

U.S. PATENT DOCUMENTS

| | | | | |
|---|---|---|---|---|
| 5,570,208 | A * | 10/1996 | Kato | G03H 1/08 359/23 |
| 6,633,409 | B1 * | 10/2003 | Yamazaki | H04N 1/56 358/1.9 |
| 9,602,693 | B1 * | 3/2017 | Tanaka | H04N 1/626 |
| 2001/0017085 | A1 * | 8/2001 | Kubo | B41J 2/01 101/35 |
| 2006/0028400 | A1 * | 2/2006 | Lapstun | G02B 26/06 345/8 |
| 2006/0028663 | A1 * | 2/2006 | Maeda | H04N 1/3875 358/1.9 |
| 2008/0181637 | A1 * | 7/2008 | Toda | G03G 15/5087 399/45 |
| 2010/0054587 | A1 * | 3/2010 | Fukuoka | G06K 9/342 382/164 |
| 2010/0054591 | A1 * | 3/2010 | Shiraishi | G06T 11/001 382/167 |

(Continued)

FOREIGN PATENT DOCUMENTS

JP          H11-216273 A    8/1999
JP          4212430 B2 *    1/2009

*Primary Examiner* — Michael Lebentritt
(74) *Attorney, Agent, or Firm* — Carter, DeLuca & Farrell LLP (57) ABSTRACT

A print division apparatus of this invention includes a feature detection unit configured to detect a feature of three-dimensional image data based on pixel information included in the three-dimensional image data, a division unit configured to divide the three-dimensional image data into a designated print size in accordance with a boundary of the feature detected based on the feature of the three-dimensional image data, and a creation unit configured to create three-dimensional shape data for the divided three-dimensional image data.

10 Claims, 8 Drawing Sheets

(56) References Cited

U.S. PATENT DOCUMENTS

| | | | | |
|---|---|---|---|---|
| 2010/0260416 | A1* | 10/2010 | Tsutsumi | G06T 5/50 |
| | | | | 382/165 |
| 2010/0274478 | A1* | 10/2010 | Takahashi | G01C 21/30 |
| | | | | 701/533 |
| 2011/0090538 | A1* | 4/2011 | Ishikawa | H04N 1/405 |
| | | | | 358/3.14 |
| 2011/0141523 | A1* | 6/2011 | Goto | G06K 15/107 |
| | | | | 358/3.01 |
| 2011/0149305 | A1* | 6/2011 | Fujita | G06K 15/107 |
| | | | | 358/1.5 |
| 2011/0234661 | A1* | 9/2011 | Goto | B41J 2/2132 |
| | | | | 347/9 |
| 2011/0285971 | A1* | 11/2011 | Oka | H04N 9/3185 |
| | | | | 353/70 |
| 2014/0198962 | A1* | 7/2014 | Anabuki | G06T 7/0014 |
| | | | | 382/128 |
| 2015/0035889 | A1* | 2/2015 | Nakano | B41J 2/2128 |
| | | | | 347/15 |
| 2015/0036193 | A1* | 2/2015 | Nakano | G06K 15/1872 |
| | | | | 358/3.26 |
| 2016/0041524 | A1* | 2/2016 | Song | G03H 1/0808 |
| | | | | 359/9 |

\* cited by examiner

PRINT DATA DIVISION APPARATUS AND PROGRAM

BACKGROUND OF THE INVENTION

Field of the Invention

The present invention relates to a print data division apparatus for dividing image data into a plurality of data and printing them.

Description of the Related Art

There is known a method of manufacturing a model integrated by shaping a plurality of portions based on three-dimensional shape data and joining the plurality of shaped portions. Japanese Patent Application Laid-Open No. H11-216273 discloses a method of manufacturing a model integrated by preparing the head and body of the model by different materials, shaping the head and body based on three-dimensional shape data, and joining the shaped head and body.

Japanese Patent Application Laid-Open No. H11-216273 assumes manufacturing of a model for which a manufacturing size and shape are predetermined. Therefore, for example, if the model size exceeds the maximum shapeable size of a shaping apparatus, it is necessary to divide the model into portions each having a size equal to or smaller than the maximum shapeable size, and shape and join them. If a predetermined shape is divided, it is possible to preset an inconspicuous division line. However, if various shapes are divided, it is difficult to preset an inconspicuous division line. Assuming that division is performed by the shapeable size of the shaping apparatus, for example, if a division line is set to equally, linearly divide a shape, a joint after joining may be conspicuous.

SUMMARY OF THE INVENTION

The present invention provides a print data division apparatus capable of making a joint after joining inconspicuous when creating three-dimensional shape data for division printing by dividing three-dimensional image data into a plurality of data.

According to the present invention, there is provided a print data division apparatus comprising, at least one processor or circuit configured to perform the operations of the following units, a feature detection unit configured to detect a feature of three-dimensional image data based on pixel information included in the three-dimensional image data, a division unit configured to divide the three-dimensional image data into a designated print size in accordance with a boundary of the feature detected based on the feature of the three-dimensional image data, and a creation unit configured to create three-dimensional shape data for the divided three-dimensional image data.

Further features of the present invention will become apparent from the following description of exemplary embodiments with reference to the attached drawings.

BRIEF DESCRIPTION OF THE DRAWINGS

FIG. 4 which is comprised of FIGS. 4A and 4B are flowcharts for explaining region division processing according to the second embodiment of the present invention.

DESCRIPTION OF THE EMBODIMENTS

Preferred embodiments of the present invention will now be described in detail in accordance with the accompanying drawings.

[First Embodiment]

Figure 1:
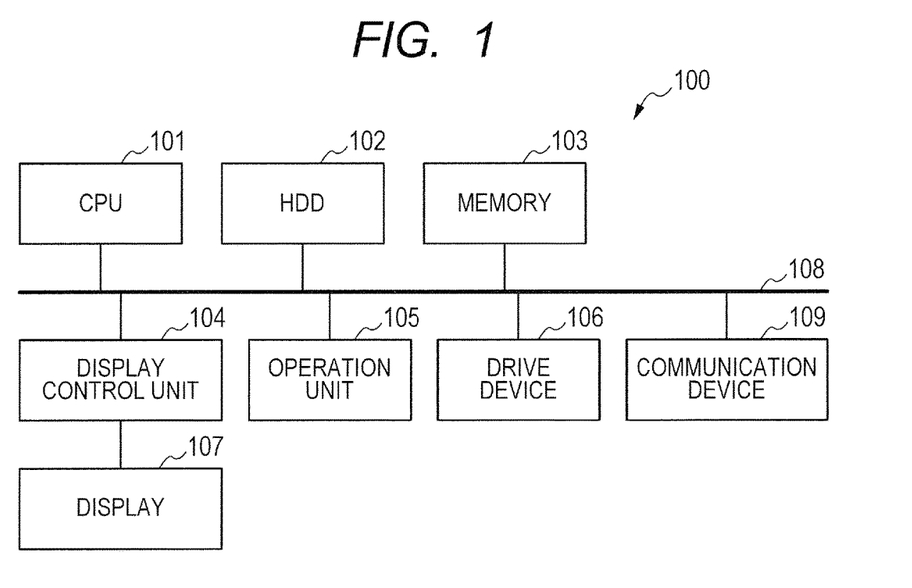
FIG. 1 is a block diagram showing a print data division apparatus according to the first embodiment of the present invention.

The first embodiment of the present invention will be described below with reference to the accompanying drawings. FIG. 1 shows an example of the arrangement of a print data division apparatus 100 to which each embodiment of the present invention is applicable. As shown in FIG. 1, the print data division apparatus 100 can be implemented using a general personal computer.

Referring to FIG. 1, the print data division apparatus 100 includes a CPU 101, a hard disk (to be referred to as an HDD hereinafter) 102, a memory 103, a display control unit 104, an operation unit 105, a drive device 106, a display 107, an internal bus 108, and a communication device 109.

The CPU (Central Processing Unit) 101 serving as a feature detection unit, division unit, and creation unit is a controller for controlling the print data division apparatus 100. The HDD 102 stores three-dimensional image data, two-dimensional image data, three-dimensional shape data, other data, and various programs to be used by the CPU 101 to operate. The memory 103 is, for example, a RAM, and temporarily stores a program, data, and the like supplied from the HDD 102. The CPU 101 controls the respective units of the print data division apparatus 100 using the memory 103 as a work memory in accordance with, for example, the programs stored in the HDD 102. Note that the programs to be used by the CPU 101 to operate may be stored in advance in, for example, a ROM (not shown) instead of the HDD 102.

The display control unit 104 outputs a display signal for displaying an image on the display 107. For example, a display control signal generated by the CPU 101 in accordance with the program is transmitted to the display control unit 104. The display control unit 104 generates a display signal based on the transmitted display control signal, and outputs the generated display signal to the display 107. For example, the display control unit 104 displays, on the display 107, a GUI screen constituting a GUI (Graphical User Interface) based on the display control signal transmitted from the CPU 101.

Upon accepting a user operation, the operation unit 105 generates a control signal corresponding to the operation, and transmits the generated control signal to the CPU 101. For example, the operation unit 105 includes, as input devices for accepting a user operation, a character information input device such as a keyboard and a pointing device such as a mouse and touch panel. The CPU 101 controls the respective units of the print data division apparatus 100 in accordance with the programs based on a control signal which is transmitted from the operation unit 105 in accordance with a user operation on the input device. This allows the print data division apparatus 100 to perform an operation corresponding to the user operation.

The touch panel is configured to output, for example, coordinate information corresponding to a touched position on the operation unit formed into a plane. If the touch panel is used as the operation unit 105, the operation unit 105 and the display 107 can be integrally formed. For example, the touch panel is formed such that the display on the display 107 is not impeded by the light transmittance of the touch panel, and attached to the upper layer of the display surface of the display 107, thereby associating input coordinates on the touch panel with display coordinates on the display 107. This can form a GUI via which the user can directly operate the screen displayed on the display 107.

The drive device 106 can be attached with an external storage medium (not shown) such as a CD or DVD, and reads out data from the attached external storage medium and writes data in the external storage medium under the control of the CPU 101. Note that the external storage medium which can be attached to the drive device 106 is not limited to the disk recording medium such as a CD or DVD, and may be, for example, a nonvolatile semiconductor memory such as a memory card.

The CPU 101, HDD 102, memory 103, display control unit 104, operation unit 105, drive device 106, and communication device 109 are connected to the internal bus 108. Each unit connected to the internal bus 108 is configured to write and reads out data via the internal bus 108. The communication device 109 communicates with a network (not shown) such as a LAN or the Internet under the control of the CPU 101.

In this embodiment, a method of dividing three-dimensional image data obtained by adding distance information for each pixel to two-dimensional image information including a color, luminance, and the like for each pixel divides the pixels into a plurality of regions based on the features of the image information. Processing of performing conversion into three-dimensional shape data for division printing based the three-dimensional image data corresponding to the pixels divided into the plurality of regions will be explained below.

Figure 2:
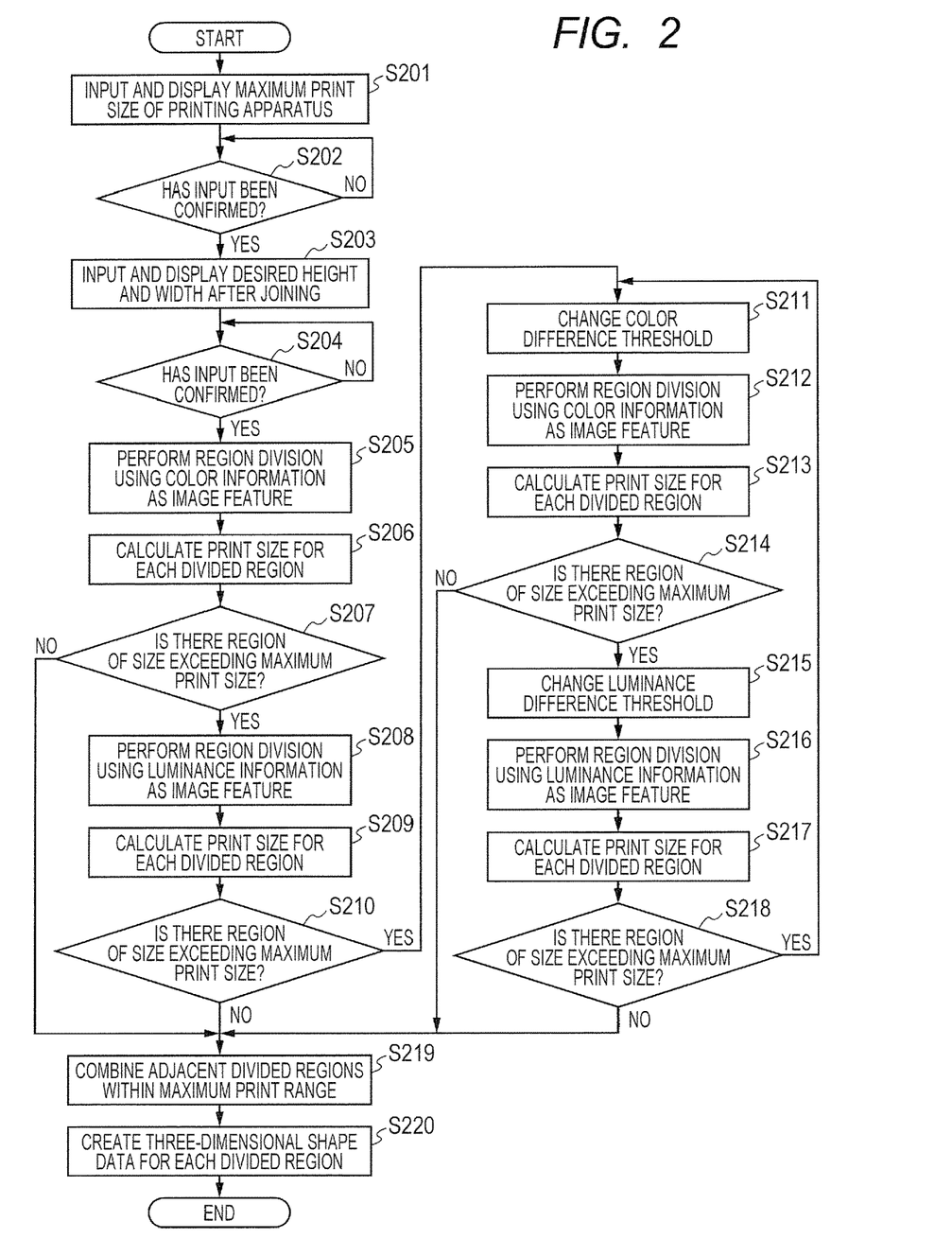
FIG. 2 is a flowchart for explaining region division processing according to the first embodiment of the present invention.

FIG. 2 is a flowchart illustrating processing of creating, based on the features of image information, three-dimensional shape data for division printing. FIGS. 3A to 3J are views showing an example in which region division is performed for three-dimensional image data based on the features of the image information. Note that the three-dimensional image data used in this embodiment need only include distance information and image information including color information and luminance information as pixel information. The three-dimensional image data may be three-dimensional distance image data acquired using, for example, infrared light or a laser beam, or three-dimensional image data obtained by acquiring distance information based on a phase difference between images of two-dimensional image data, and adding the distance information to the pixel information of the two-dimensional image data. This is merely an example, and the present invention is not limited to this as long as it is possible to acquire three-dimensional image data. The distance information represents the distance between an object and an image capturing apparatus which has acquired the image information.

In step S201, the CPU 101 transmits, to the display control unit 104, a display control signal for inputting and displaying the maximum print size in the height, width, and thickness directions of a printing apparatus to be used. The maximum print size indicates that of a printable height, width and thickness in the printing apparatus. An inputtable maximum print size depends on the specifications of the printing apparatus to be used.

In step S202, the CPU 101 determines whether the input of the maximum print size has been confirmed using the operation unit 105. If it is determined that the input has been confirmed (YES in step S202), the CPU 101 stores the maximum print size in the memory 103, and advances to step S203. If it is determined that the input has not been confirmed (NO in step S202), the CPU 101 returns to step S202.

In step S203, the CPU 101 transmits, to the display control unit 104, a display control signal for inputting and displaying a desired height and width, that is, a desired size in the height and width directions after joining. A printed material according to this embodiment has a relief shape. The desired height and width indicate a size in the height and width directions when printed materials are joined into a relief shape.

In step S204, the CPU 101 determines whether the input of the desired size in the height and width directions has been confirmed using the operation unit 105. If it is determined that the input of the desired size has been confirmed (YES in step S204), the CPU 101 stores the desired size in the memory 103, and advances to step S205. If it is determined that the input of the desired size has not been confirmed (NO in step S204), the CPU 101 returns to step S204. When the pieces of image information of the three-dimensional image data are three-dimensionally printed, pixel positions indicate information similar to the height and width. Note that when the pieces of distance information of the three-dimensional image data are three-dimensionally printed, the relative distance difference between the pieces of distance information, that is, the difference between the maximum and minimum values of the pieces of distance information indicates information similar to the thickness.

In step S205, the CPU 101 performs region division processing by detecting the color information of the three-dimensional image data as image feature. For example, the CPU 101 sets, as one block, an image data region in the three-dimensional image data read out from the HDD 102, and determines a hue of the pixel information of each pixel within the block. If the hue in the block is not uniform, the block is repeatedly subdivided. If similar colors having a difference between hues in adjacent blocks, that is, a color difference, which is equal to or smaller than a division threshold, are determined, the CPU 101 performs division into regions each including similar colors by combining the adjacent blocks, and stores a division result in the memory 103. Note that the color information is, for example, information indicating the pixel values of the primary colors (RGB) of each pixel, a color difference, and the like. The division threshold is a color difference threshold, and may be preset or obtained by calculation.

Figure 3A:
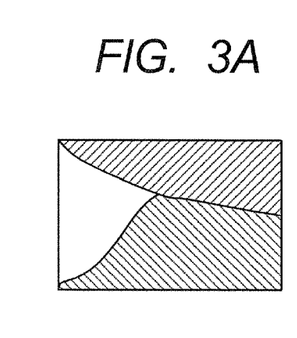
FIGS. 3A, 3B, 3C, 3D, 3E, 3F, 3G, 3H, 3I and 3J are views showing an example of region division based on image features.
Figure 3B:
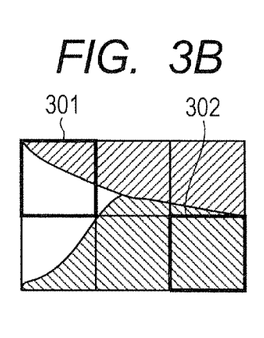
Figure 3C:
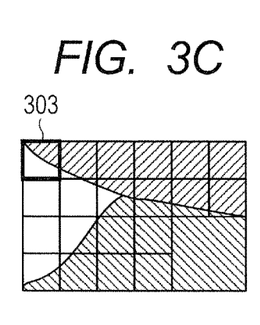
Figure 3D:
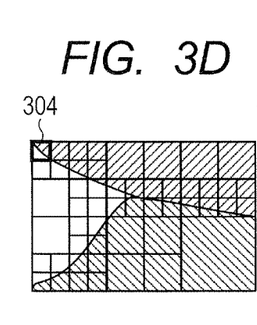
Figure 3E:
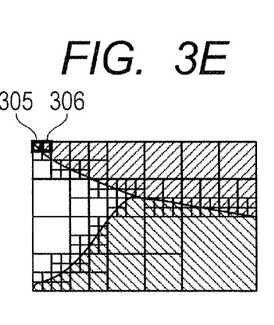
Figure 3F:
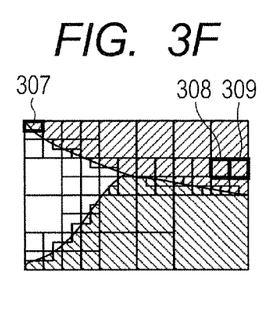
Figure 3G:
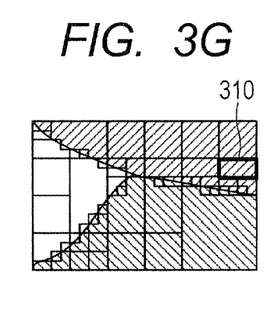
Figure 3H:
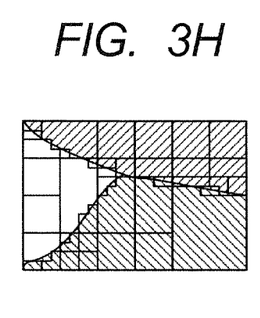
Figure 3I:
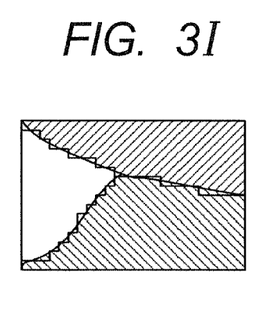
Figure 3J:
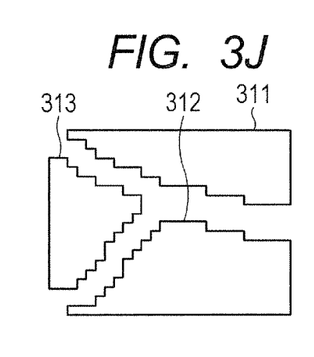

FIGS. 3A to 3J are views showing an example of region division based on the image features of the three-dimensional image data added with the distance information. FIGS. 3A to 3E show a division process. FIGS. 3F to 3I show a combining process. FIG. 3J shows a region division result. FIG. 3A shows three-dimensional image data having color features of a three-color system of a right obliquely hatched portion, left obliquely hatched portion, and white portion. In the three-dimensional image data, it is determined by hue histogram analysis that the color features are not uniform, and the image data is subdivided. FIG. 3B shows a state in which the image data shown in FIG. 3A is divided into six data. For example, a block 301 is determined not to have a uniform color feature by hue histogram analysis, and is to be subdivided. Similarly, by hue histogram analysis, blocks other than a block 302 are determined not to have a uniform color feature, and are to be subdivided.

FIG. 3C is a block diagram showing a state in which each of the blocks that has been determined not to have a uniform color feature, among the six blocks shown in FIG. 3B, is further subdivided into four blocks. For example, a block 303 is determined not to have a uniform color feature by hue histogram analysis, and is to be subdivided. FIG. 3D shows a state in which each of blocks that has been determined not to have a uniform color feature, among the 24 divided blocks shown in FIG. 3C, is further subdivided into four blocks. For example, a block 304 is determined not to have a uniform color feature by hue histogram analysis, and is to be subdivided. FIG. 3E shows a state in which each of blocks that has been determined not to have a uniform color feature, among the 96 divided blocks shown in FIG. 3D, is further subdivided into four blocks. The minimum size of a block is 1/384. In this way, subdivision of a block that has been determined not to have a uniform color feature is repeated.

FIG. 3F is a view showing a state in which, among the 384 blocks shown in FIG. 3E, blocks whose difference in color hue, that is, whose difference in color feature is equal to or smaller than a threshold are combined. For example, if a difference in color feature between adjacent blocks 305 and 306 is equal to or smaller than the threshold, these blocks are combined into a block 307. FIG. 3G is a view showing a state in which, among the blocks shown in FIG. 3F, blocks whose distance in color feature is equal to or smaller than threshold are combined. For example, if a difference in color feature between adjacent blocks 308 and 309 is equal to or smaller than the threshold, these blocks are combined into a block 310. In FIG. 3H, combining is repeated in the same manner. FIG. 3I is a view showing a state in which combining ends. FIG. 3J is a view showing a state in which the three-dimensional image data is divided into three three-dimensional image data as indicated by regions 311, 312, and 313 by division lines determined in the processes up to FIG. 3I. Each of the divided three-dimensional image data can be converted into three-dimensional shape data.

There have been proposed various techniques of performing region division based on image features. A division technique applicable to this embodiment is not limited to a specific one. Although the division lines are stepwise in FIG. 3J, this is because the blocks are coarse for the descriptive purpose. It is possible to obtain smooth division lines by further decreasing the sizes of the blocks.

In step S206, the CPU 101 reads out the divided three-dimensional image data from the memory 103, and calculates a print size for the region of each divided three-dimensional image data. For example, by calculating the ratio of the pixels of each divided region to all the pixels, it is possible to calculate a print size in the height and width directions for each divided region when printing is to be executed for the desired height and width after joining.

In step S207, the CPU 101 reads out the maximum print size of the printing apparatus from the memory 103, and determines whether there is a divided region of a print size exceeding the maximum print size. If there is a divided region of a print size exceeding the maximum print size (YES in step S207), the CPU 101 determines that the divided region has no printable size, and advances to step S208. If there is not a divided region of a print size exceeding the maximum print size (NO in step S207), the CPU 101 determines that the divided region has a printable size, and advances to step S219.

In step S208, the CPU 101 performs region division by detecting the luminance information as image feature for the divided region of the print size exceeding the maximum print size of the printing apparatus, and stores a region division result in the memory 103. For example, the CPU 101 divides the block which has been determined by luminance histogram analysis or the like not to have uniform luminance, and repeats division of the block, similarly to region division based on the color features shown in FIGS. 3A to 3J. The CPU 101 can calculate the luminance standard deviation of all the pixels in the three-dimensional image data, calculate a division threshold based on the luminance standard deviation, and combine adjacent pixels whose absolute value of a luminance difference is equal to or smaller than the division threshold, thereby dividing the image data at the boundary between regions each including similar luminances. Note that the division threshold is a luminance difference threshold.

In step S209, the CPU 101 reads out the divided regions from the memory 103, and calculates a print size for each divided region. In step S210, the CPU 101 determines whether there is a divided region of a print size exceeding the maximum print size of the printing apparatus. If there is a divided region of a print size exceeding the maximum print size (YES in step S210), the CPU 101 determines that the divided region has no printable size, and advances to step S211. If there is not a divided region of a print size exceeding the maximum print size (NO in step S210), the CPU 101 determines that the divided region has a printable size, and advances to step S219.

In step S211, when performing region division using the color information as image feature, the CPU 101 changes the color difference threshold so as to divide the region into smaller regions, and stores it in the memory 103. In step S212, the CPU 101 reads out the color difference threshold from the memory 103, performs region division for the divided region of the print size exceeding the maximum print size of the printing apparatus using the color information as image feature, and stores a region division result in the memory 103. Region division performed in step S212 is the same as that performed in step S205.

In step S213, the CPU 101 reads out the divided regions from the memory 103, and calculates a print size for each divided region. In step S214, the CPU 101 determines whether there is a divided region of a print size exceeding the maximum print size of the printing apparatus. If there is a divided region of a print size exceeding the maximum print size (YES in step S214), the CPU 101 determines that the divided region has no printable size, and advances to step S215. If there is not a divided region of a print size exceeding the maximum print size (NO in step S214), the CPU 101 determines that the divided region has a printable size, and advances to step S219.

In step S215, when performing region division using the luminance information as image feature, the CPU 101 changes the luminance difference threshold so as to readily divide the region into smaller regions, and stores it in the memory 103. In step S216, the CPU 101 reads out the luminance difference threshold from the memory 103, performs region division for the divided region of the print size exceeding the maximum print size of the printing apparatus using the luminance information as image feature, and stores a region division result in the memory 103. Region division performed in step S216 is the same as that based on the luminance information in step S208.

In step S217, the CPU 101 calculates a print size for each divided region. In step S218, the CPU 101 determines whether there is a divided region of a print size exceeding the maximum print size of the printing apparatus. If there is a divided region of a print size exceeding the maximum print size (YES in step S218), the CPU 101 determines that the divided region has no printable size, and returns to step S211. If there is not a divided region of a print size exceeding the maximum print size (NO in step S218), the CPU 101 determines that the divided region has a printable size, and advances to step S219. As described above, region division is performed in descending order of the color difference or luminance difference until there is no divided region of a print size exceeding the maximum print size of the printing apparatus. That is, the region is divided into regions to fall within the maximum print size by setting a boundary at a position where the color difference or luminance difference is equal to or larger than a predetermined difference.

In step S219, the CPU 101 decreases the total division count by combining adjacent divided regions into one divided region without exceeding the maximum print size. This prevents an unnecessary joint from occurring due to excessive subdivision of the region.

In step S220, the CPU 101 creates three-dimensional shape data for division printing based on the divided three-dimensional image data, and stores them in the HDD 102, thereby terminating the process. The three-dimensional shape data is also called three-dimensional print file, and is a shape data file which is described in, for example, STL format data or VRML format data, and is usable by a three-dimensional shaping apparatus, and a conversion destination file format is not limited. In printing of a three-dimensional relief shape, it is common practice to maintain the aspect ratio in the two image directions so as not to give an unnatural feeling in appearance. However, with respect to a depth, conversion from the distance information into thickness information may be nonlinear like a logarithmic ratio depending on how much a stereoscopic effect is enhanced. Even if conversion from the distance information into thickness information is nonlinear, the boundary such as the color difference or luminance difference between the pieces of image information does not disappear. Therefore, if the boundary overlaps a division line, a joint becomes less conspicuous. This embodiment assumes that processing is performed so that the thickness of a portion in which the relative distance difference is largest, that is, the thickness of a thickest portion is equal to or smaller than the thickness of the maximum print size. This creates three-dimensional shape data for division printing for which conversion from distance information into thickness information has been performed.

As describe above, in this embodiment, region division is performed using the luminance information and color information as the features of the image information until the height and width become those printable within the maximum print size of the printing apparatus by setting a boundary at a position where the luminance difference or color difference is equal to or larger than a predetermined difference. With this processing, a joint obtained by joining after printing overlaps the contour of an image, and thus becomes less conspicuous. Furthermore, since a joint is determined using the color information, if coloring is performed, the joint becomes less conspicuous.

[Second Embodiment]

The second embodiment of the present invention is different from the first embodiment in that pixels are divided into a plurality of regions preferentially based on the features of distance information and supplementarily based on the features of image information in there-dimensional image data. That is, after the boundaries between features are detected using the features of the distance information, the boundaries between the features are detected using the features of the image information, thereby dividing the three-dimensional image data in accordance with the detected boundaries between the features. An example of performing conversion into three-dimensional shape data for division printing based on the three-dimensional image data corresponding to the pixels divided into the plurality of regions will be described below.

Figures 4, 4A:
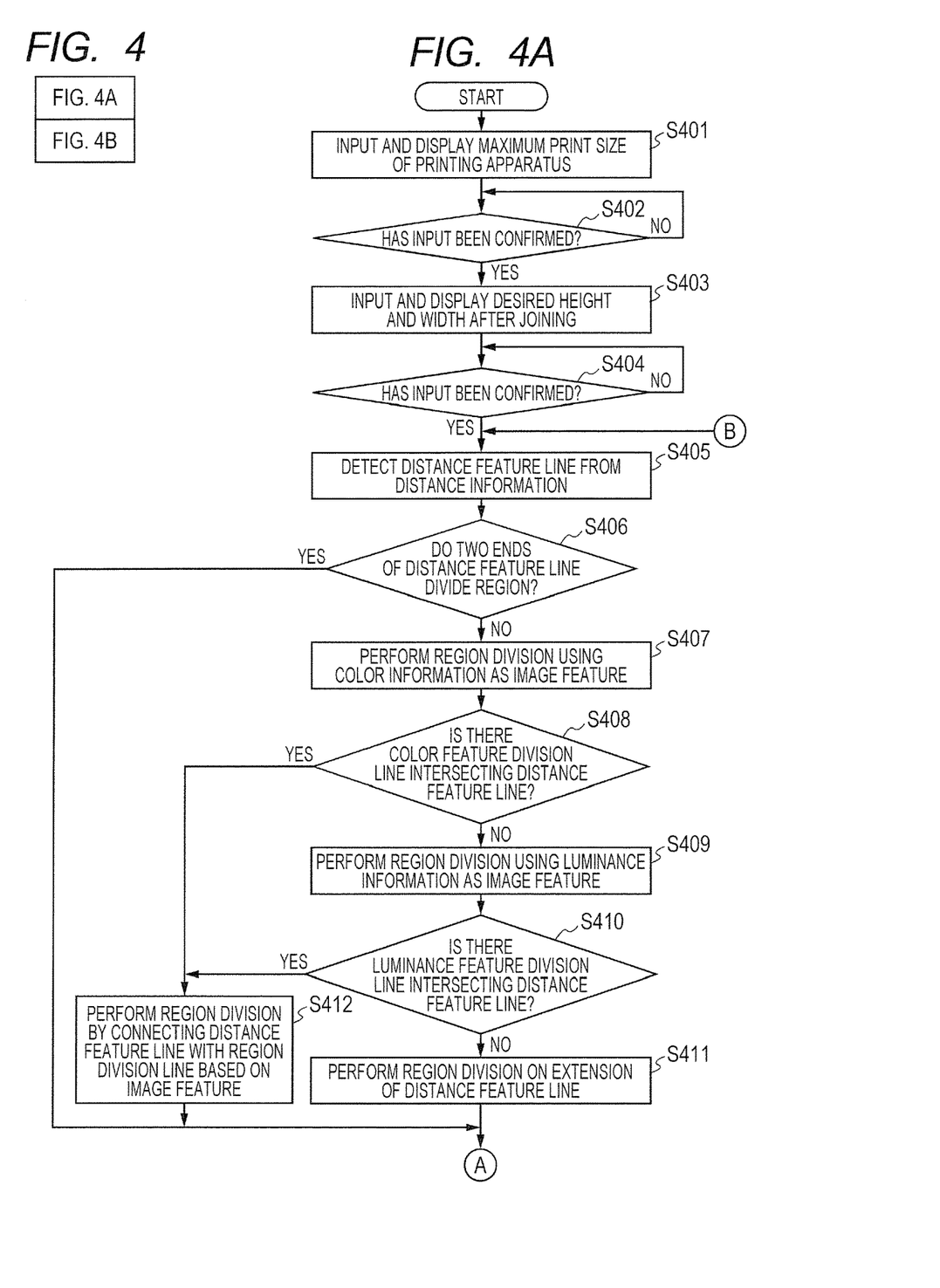

FIG. 4 is flowcharts illustrating conversion into three-dimensional shape data for division printing based on the features of the distance information and image information. FIGS. 5A to 5F are views showing an example in which region division is performed for pixels based on the features of the distance information and image information.

In step S401, a CPU 101 transmits, to a display control unit 104, a display control signal for inputting and displaying the maximum print size in the height, width, and thickness directions of a printing apparatus to be used. In step S402, the CPU 101 determines whether the input of the maximum print size has been confirmed using an operation unit 105. If it is determined that the input of the maximum print size has been confirmed (YES in step S402), the CPU 101 stores the maximum print size in a memory 103, and advances to step S403. If it is determined that the input of the maximum print size has not been confirmed (NO in step S402), the CPU 101 returns to step S402.

In step S403, the CPU 101 transmits, to the display control unit 104, a display control signal for inputting and displaying a desired size in the height and width directions after joining. In step S404, the CPU 101 determines whether the input of the desired size has been confirmed using the operation unit 105. If it is determined that the input of the desired size has been confirmed (YES in step S404), the CPU 101 stores the desired print size in the memory 103, and advances to step S405. If it is determined that the input of the desired size has not been confirmed (NO in step S404), the CPU 101 returns to step S404.

In step S405, the CPU 101 performs processing of detecting, as the distance feature of the distance information added to two-dimensional image information for each pixel, a distance feature line serving as a bend, and stores the detected distance feature line in the memory 103. The distance feature line is a ridge line, a line representing a step based on a distance difference, or the like. As a distance feature line detection method, for example, there is provided a method of extracting, from the two-dimensional data in which a distance value for each pixel is regarded as the height of a mountain, a ridge line by connecting cells selected by weighing cells within a predetermined region with reference to the maximum distance value in the predetermined region. Alternatively, it is possible to detect a large step by calculating the difference between the height of a target pixel and that of a pixel adjacent to the target pixel as the first-order derivative, that is, the tilt of a tangent, and detecting the magnitude of the value. It is possible to detect a ridge line for which the tilt is reversed, by calculating, as the second-order derivative, that is, the inflection of the tangent, the difference between the difference calculated for the height of the target pixel and the difference between the heights of a plurality of pixels adjacent to the target pixel. There are proposed a number of ridge line detection techniques and step detection techniques, and a technique of detecting a ridge line or step as a distance feature line for region division applicable to this embodiment is not limited to a specific detection technique.

In step S406, the CPU 101 reads out the distance feature line detected in step S405 from the memory 103, and determines whether the two ends of the distance feature line divide a division target region. If the two ends of the distance feature line do not divide the division target region (NO in step S406), the CPU 101 determines that the region cannot be divided by setting the distance feature line as a boundary, and advances to step S407. If the two ends of the distance feature line divide the division target region (YES in step S406), the CPU 101 determines that the region is divided by setting the distance feature line as a boundary, and advances to step S413. That is, if the distance feature line can only be extracted halfway in the region, and is broken, the process advances to step S407.

Figure 5A:
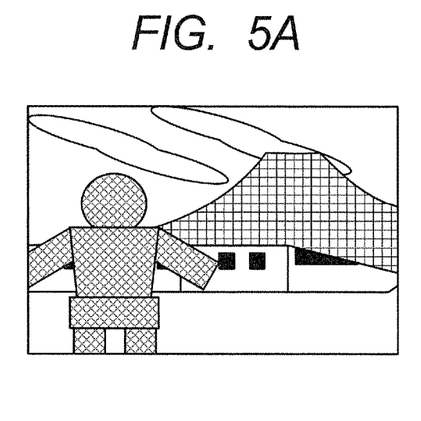
FIGS. 5A, 5B, 5C, 5D, 5E and 5F are views showing an example of region division based on distance features and image features.
Figure 5B:
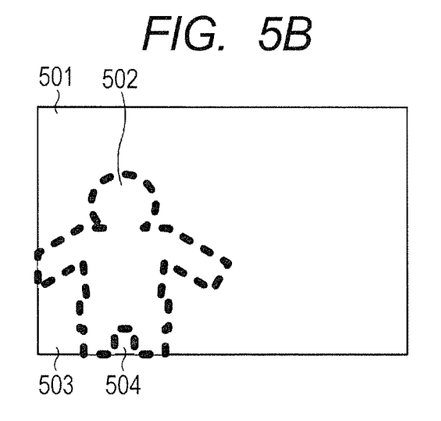
Figure 5C:
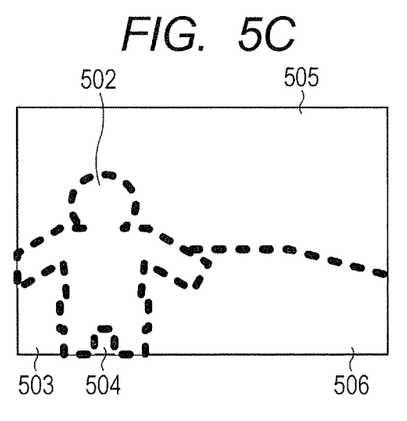

FIGS. 5A to 5F are views showing an example of region division using the distance features and image features. FIG. 5A shows an image in which a human type object is arranged at a short distance, a train is arranged at a middle distance, and a mountain, sky, and clouds are arranged at a long distance when viewing from an image capturing apparatus. FIG. 5B is a view showing a state in which pixels each having a distance step with respect to another pixel are detected as a distance feature line from the image shown in FIG. 5A, and region division is performed by setting the distance feature line as a human type object region 502. FIG. 5B shows a state in which the image shown in FIG. 5A is divided into four regions of a background region 501, the human type object region 502, an underarm region 503, and a crotch region 504 by the distance feature line. FIG. 5C is a view showing a state in which region division is performed into a train region 506 and a mountain region 505 at the boundary between the train and the mountain, at which there is a distance step in the background region 501.

In step S407, the CPU 101 performs region division based on color information as image feature, and stores a region division result in the memory 103. Region division based on the color information is the same as that in step S205 described in the first embodiment. In step S408, the CPU 101 reads out, from the memory 103, the regions divided based on the distance feature line and color information, and determines whether there is a point at which the distance feature line detected in step S405 intersects the division line used for division based on the color information in step S407. If the distance feature line and the division line do not intersect each other (NO in step S408), the CPU 101 determines that no region division can be performed by the distance feature line and the division line used for division based on the color information, and advances to step S409. If the distance feature line and the division line intersect each other (YES in step S408), the CPU 101 determines that the region can be divided, and advances to step S412.

In step S409, the CPU 101 performs region division based on luminance information as image feature, and stores a region division result in the memory 103. Region division based on the luminance information is the same as that in step S208 described in the first embodiment. In step S410, the CPU 101 reads out, from the memory 103, the regions divided based on the distance feature line and the luminance information, and determines whether there is a point at which the distance feature line detected in step S405 intersects the division line used for division based on the luminance information. If the distance feature line does not intersect the division line (NO in step S410), the CPU 101 determines that no region division can be performed by the distance feature line and the division line used for division based on the luminance information, and advances to step S411. If the distance feature line intersects the division line (YES in step S410), the CPU 101 determines that the region can be divided, and advances to step S412.

In step S411, the CPU 101 extends the two ends of the distance feature line detected in step S405 in the tangent direction, performs region division using, as a division line, a line obtained by extending the distance feature line until the region can be divided, and stores a region division result in the memory 103. That is, if there is no division line based on the image features, which intersects the distance feature line, the distance feature line cannot be changed to the division line based on the image features, and thus the region is divided by the extension of the distance feature line.

In step S412, the CPU 101 determines, as a region division line based on the distance feature, a line up to an intersection point between the distance feature line detected in step S405 and the division line used for division based on the color information or luminance information at the two ends of the distance feature line. The CPU 101 performs region division by connecting the lines at the intersection point between the distance feature line and the division line so as to change from the distance feature line to the division line based on the image features, and stores a region division result in the memory 103. That is, the CPU 101 performs region division along the boundary between colors or luminances in the middle of the distance feature line. In this embodiment, since the division line used for division based on the image information is conspicuous until it is colored after joining, the distance features are preferentially used. However, if it is assumed that the division line is colored, the image features can preferentially be used.

Figure 4B:
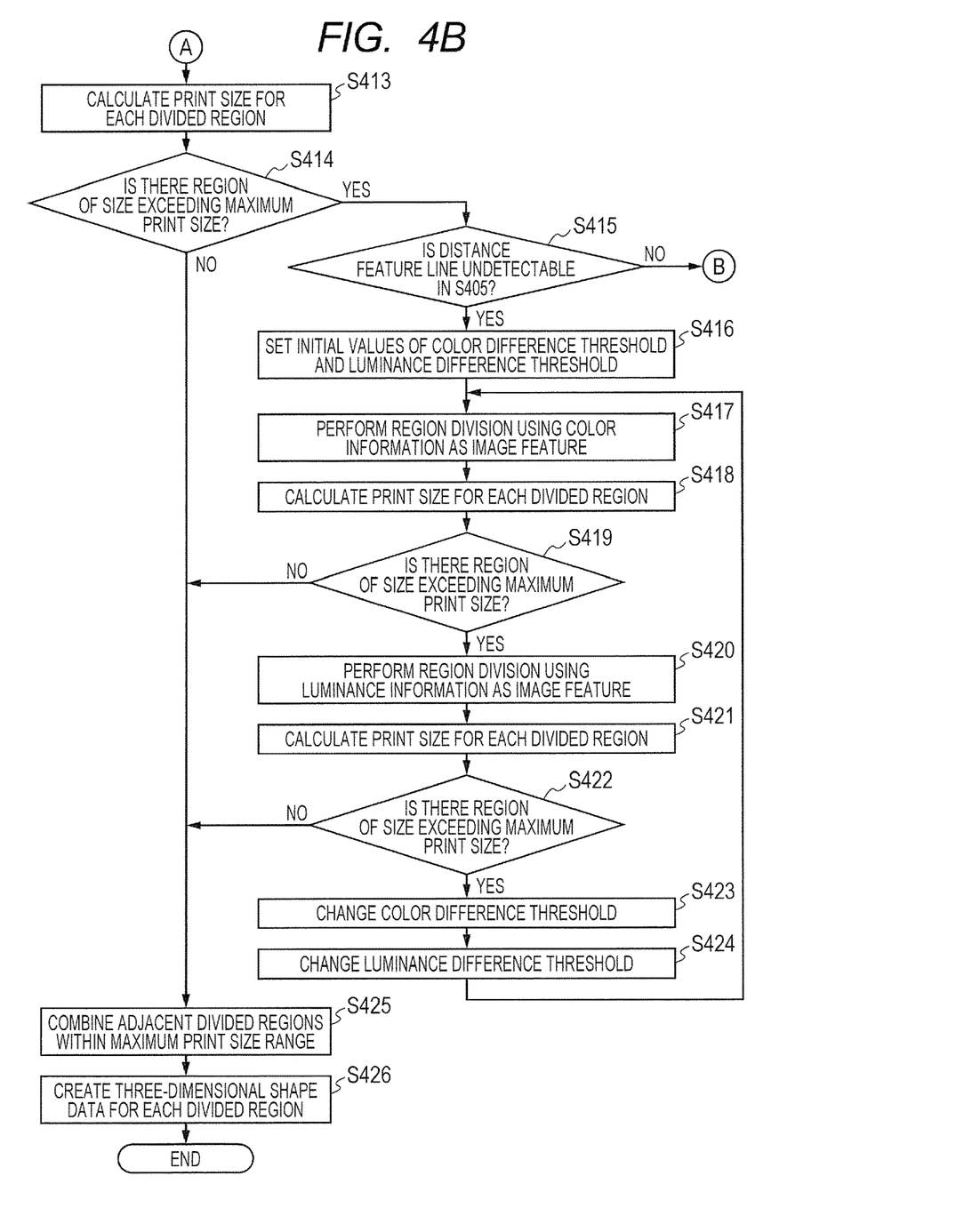

In step S413, the CPU 101 reads out the divided regions from the memory 103, and calculates a print size for each divided region. In step S414, the CPU 101 determines whether there is a divided region of a print size exceeding the maximum print size of the printing apparatus. If there is a divided region of a print size exceeding the maximum print size (YES in step S414), the CPU 101 determines that the divided region has no printable size, and advances to step S415. If there is not a divided region of a print size exceeding the maximum print size (NO in step S414), the CPU 101 determines that the divided region has a printable size, and advances to step S425.

In step S415, the CPU 101 determines whether the distance feature line is undetectable in step S405. If the distance feature line is undetectable (YES in step S415), the CPU 101 determines that no distance feature line can be detected, and advances to step S416. If the distance feature line is detectable (NO in step S415), the CPU 101 returns to step S405 to detect the next distance feature line. The mountain region 505 shown in FIG. 5C includes the mountain, sky, and clouds. Since, however, the mountain region 505 is at a long distance, the resolution is coarse as distance information, and no distance feature line can be detected. As for such image, the process transits to step S416.

In step S416, the CPU 101 sets initial values of a color distance threshold and luminance difference threshold, and stores them in the memory 103. In step S417, the CPU 101 reads out the color difference threshold from the memory 103, performs region division using the color information as image feature, and stores a region division result in the memory 103. Region division based on the color information is the same as that in step S407. In step S418, the CPU 101 calculates a print size for each divided region. In step S419, the CPU 101 reads out the maximum print size of the printing apparatus from the memory 103, and determines whether there is a divided region of a print size exceeding the maximum print size designated in step S402. If there is a divided region of a print size exceeding the maximum print size (YES in step S419), the CPU 101 determines that the divided region has no printable size, and advances to step S420. If there is not a divided region of a print size exceeding the maximum print size (NO in step S419), the CPU 101 determines that the divided region has a printable size, and advances to step S425.

In step S420, the CPU 101 reads out the luminance difference threshold from the memory 103, performs region division for the divided region of the print size exceeding the maximum print size of the printing apparatus using the luminance information as image feature, and stores a region division result in the memory 103. Region division based on the luminance information is the same as that in step S409. In step S421, the CPU 101 calculates a print size for each divided region. In step S422, the CPU 101 determines whether there is a divided region of a print size exceeding the maximum print size of the printing apparatus. If there is a divided region of a print size exceeding the maximum print size (YES in step S422), the CPU 101 determines that the divided region has no printable size, and advances to step S423. If there is not a divided region of a print size exceeding the maximum print size (NO in step S422), the CPU 101 determines that the divided region has a printable size, and advances to step S425.

Figure 5D:
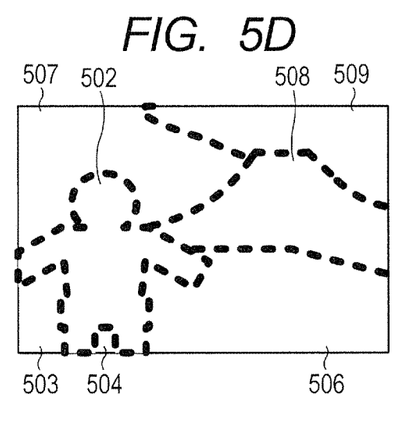

In step S423, when performing region division using the color information as image features, the CPU 101 changes the color difference threshold so as to readily divide the region into smaller regions, and stores it in the memory 103. In step S424, when performing region division using the luminance information as image features, the CPU 101 changes the luminance difference threshold so as to readily divide the region into smaller regions, and stores it in the memory 103. As described above, the region is divided into a plurality of regions based on the features of the distance information first. After no features of the distance information can be found any more, region division is performed using the luminance information and color information as the features of the image information. FIG. 5D is a view showing a state in which region division is performed for the mountain region 505 shown in FIG. 5C based on the features of the color information and luminance information to obtain a sky region 507, a mountain region 508, and a sky region 509.

In step S425, the CPU 101 combines adjacent divided regions into one divided region without exceeding the maximum print size, and stores the combined divided region in the memory 103. This can decrease the total division count, and prevent an unnecessary joint from occurring due to excessive subdivision.

Figure 5E:
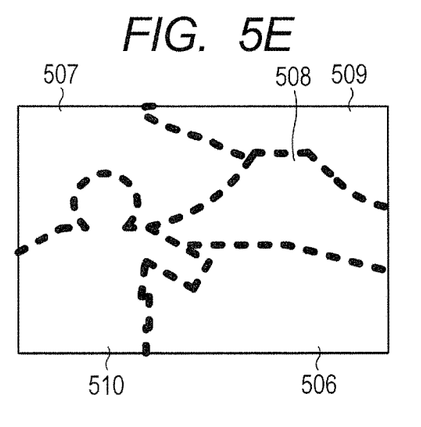
Figure 5F:
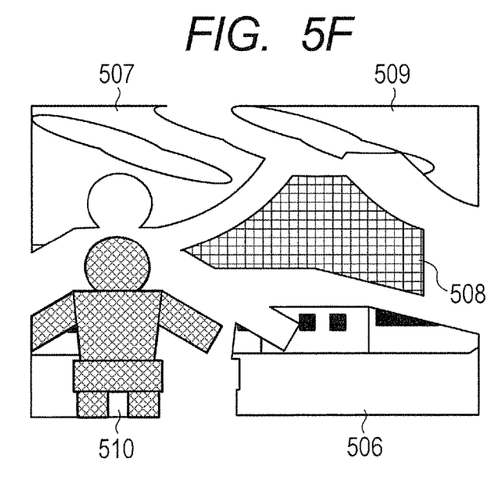

FIG. 5E is a view showing a state in which the human object region 502, the underarm region 503, and the crotch region 504 are combined into a left region 510. The five regions 506 to 510 shown in FIG. 5F indicate final divided regions. In step S426, the CPU 101 creates three-dimensional shape data for division printing based on the divided three-dimensional image data, and stores the created data in an HDD 102, thereby terminating the process. Even if printed materials printed based on the divided three-dimensional image data are combined, it is difficult to generate conspicuous joints since the joints of the divided regions disappear in the distance steps and color/luminance boundaries of the original stereoscopic image.

In three-dimensional landscape printing, it is common practice to maintain the aspect ratio of an image in the two directions so as not to give an unnatural feeling in appearance. However, with respect to a depth, conversion from distance information into thickness information may be nonlinear like a logarithmic ratio depending on how much a stereoscopic effect is enhanced. Even if conversion from distance information into thickness information is nonlinear, a distance feature line such as a ridge, cliff, or valley exists in the distance information. Therefore, if the distance feature line overlaps a division line in printing, a joint becomes less conspicuous. This embodiment assumes that processing of creating three-dimensional shape data for division printing is performed so that the thickness of a portion in which a relative distance difference is largest, that is, the thickness of the thickest left region 510 shown in FIG. 5E is equal to or smaller than the thickness of the maximum print size. If the aspect ratio of the two-dimensional image is changed, the distance feature line such as a ridge, cliff, or valley is also changed at the same time and does not disappear as long as image information and distance information are associated with each other. Consequently, if the distance feature line overlaps a division line in printing, a joint becomes less conspicuous.

As described above, in this embodiment, the boundaries of the three-dimensional image data are detected based on the distance information, and then detected based on the luminance information and color information as the features of the image information. Region division is performed until the height and width become those printable within the maximum print size of the printing apparatus in accordance with the detected boundaries. With this processing, region division is performed so that a joint is along the distance feature line such as a ridge, cliff, or valley or a portion in which the luminance difference or color difference is large. Consequently, a joint obtained by joining after printing overlaps the three-dimensional structure of a stereoscopic image or the contour of an image, and thus becomes less conspicuous.

[Third Embodiment]

The third embodiment of the present invention is different in that pixels are divided into a plurality of regions preferentially based on the features of distance information and supplementarily based on the features of image information in there-dimensional image data obtained by adding distance information for each pixel to two-dimensional image information including a color and luminance for each pixel. That is, after the boundaries between features are detected using the features of the distance information, the boundaries between the features are detected using the features of the image information, thereby dividing the three-dimensional image data in accordance with the detected boundaries between the features. An example of performing conversion into three-dimensional shape data for division printing by assigning conversion to a longest side in the specifications of a printing apparatus when creating thickness data from a distance based on the three-dimensional image data corresponding to the pixels divided into the plurality of regions will be described below.

Figure 6:
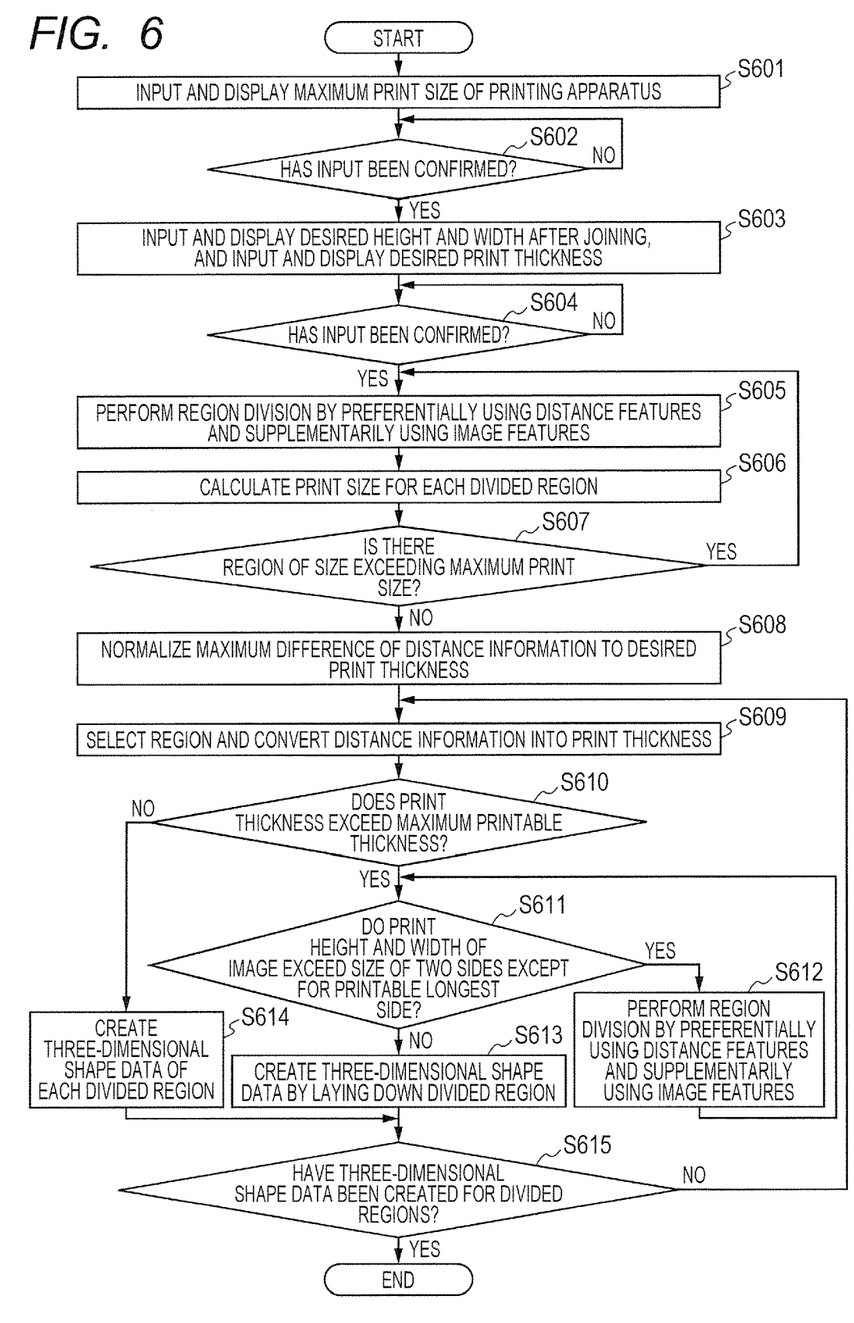
FIG. 6 is a flowchart for explaining region division processing according to the third embodiment of the present invention.

FIG. 6 is a flowchart illustrating conversion into three-dimensional shape data for division printing based on the features of distance information and image information according to this embodiment. FIGS. 7A to 7E are views showing an example in which region division is performed for pixels based on the features of the distance information and image information until an exact size becomes that printable by a printing apparatus.

In step S601, a CPU 101 transmits, to a display control unit 104, a display control signal for inputting and displaying the maximum print size in the height, width, and thickness directions of the printing apparatus to be used. A block 701 shown in FIG. 7A indicates a shape when the maximum print size is printed, and the shape has a maximum width 701w, a maximum height 701h, and a maximum thickness 701d. In this embodiment, the maximum width 701w is equal to the maximum height 701h, and the maximum thickness 701d is smaller than the two sides of the maximum width 701w and maximum height 701h.

In step S602, the CPU 101 determines whether the input of the maximum print size has been confirmed using an operation unit 105. If it is determined that the input has been confirmed (YES in step S602), the CPU 101 stores the maximum print size in a memory 103, and advances to step S603. If it is determined that the input has not been confirmed (NO in step S602), the CPU 101 returns to step S602. In step S603, the CPU 101 transmits, to the display control unit 104, a display control signal for inputting and displaying desired height and width after joining, and a desired print thickness.

Figure 7A:
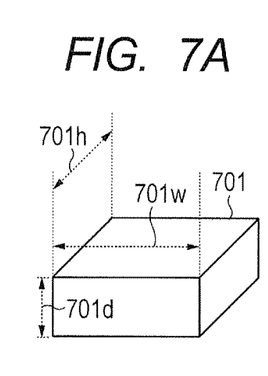
FIGS. 7A, 7B, 7C, 7D and 7E are schematic views showing a case in which region division is performed for pixels until a printable size is obtained.
Figure 7B:
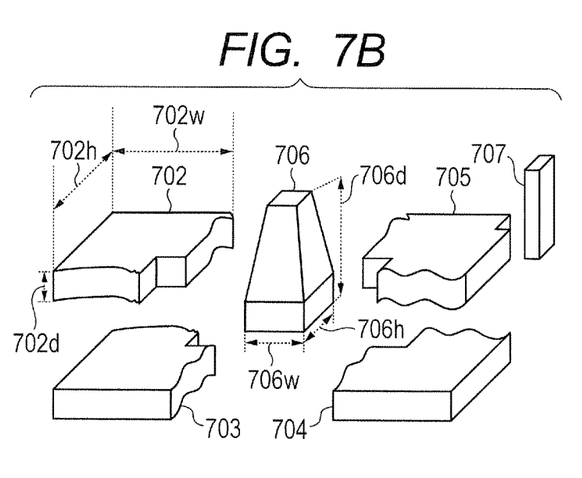

Stereoscopic images 702 to 707 shown in FIG. 7B are stereoscopic images of regions divided by processing (to be described later). The desired height and width indicate a total size in the height and width directions when the stereoscopic images are converted into three-dimensional shape data, undergo division printing, and then joined. A value input as the desired print thickness is equal to or smaller than the length of the longest side printable by the printing apparatus, and is, for example, a thickness 706d of the thickest stereoscopic image 706. A value equal to or smaller than the printable maximum height 701h is input as the desired print thickness.

In step S604, the CPU 101 determines whether the input of the desired height, width, and thickness has been confirmed using the operation unit 105. If it is determined that the input has been confirmed (YES in step S604), the CPU 101 stores the desired height, width, and thickness in the memory 103, and advances to step S605. If it is determined that the input has not been confirmed (NO in step S604), the CPU 101 returns to step S604. This embodiment shows an example in which joints obtained by joining in the height and width direction are inconspicuous even when viewing from the front. Since the regions are not joined in the thickness direction, the maximum thickness of one divided region is limited to a value equal to or smaller than the length of the longest side of the maximum print size in the height, width, and thickness directions of the printing apparatus. That is, the maximum thickness of one divided region is limited to a value equal to or smaller than the maximum height 701h shown in FIG. 7A. Note that in this embodiment, the maximum height 701h is preferentially set as a longest side.

In step S605, the CPU 101 performs region division by preferentially using distance features, and supplementarily using image features. That is, in step S605, after the boundaries between the distance features are detected using the distance features, boundaries are detected using the image features, that is, the features of color information and luminance information are detected, and the region is divided in accordance with the detected boundaries. Region division performed in step S605 is the same as that in steps S405 to S412 described in the second embodiment and a description thereof will be omitted. In step S606, the CPU 101 calculates a print size for each divided region, and stores them in the memory 103.

In step S607, the CPU 101 determines whether there is a divided region of a print size exceeding the maximum print size in the height and width directions of the printing apparatus. The maximum print size in step S607 indicates the maximum print size in the height and width directions. If there is a divided region of a print size exceeding the maximum print size (YES in step S607), the CPU 101 determines that the divided region has no printable size, and returns to step S605. If there is not a divided region of a print size exceeding the maximum print size (NO in step S607), the CPU 101 determines that the divided region has a printable size, and advances to step S608. The region division processing repeatedly performed until the size of the divided region becomes equal to or smaller than the maximum print size is the same as in the first and second embodiments and a description thereof will be omitted.

As indicated by the stereoscopic image 702 in FIG. 7B, division is performed until an image width 702w at the time of division printing becomes equal to or smaller than the maximum width 701w and an image height 702h becomes equal to or smaller than the maximum height 701h. Conversion from the image size into the exact size is the same as in the first embodiment and a description thereof will be omitted. The width and height, at the time of division printing, of each of the stereoscopic images 703 to 707 shown in FIG. 7B are equal to or smaller than the maximum width 701w and maximum height 701h, respectively.

In step S608, the CPU 101 normalizes the maximum difference between the pieces of distance information to the desired print thickness. This converts the maximum distance difference between a long distance and a short distance into the maximum print thickness at the time of printing. In step S609, the CPU 101 selects one of the divided regions, converts the distance difference between the pieces of distance information within the selected divided region into a thickness normalized by the maximum print thickness, and stores the thickness in the memory 103. This performs conversion into a print thickness corresponding to the distance difference. Since the thickness 706d of the stereoscopic image 706 shown in FIG. 7B is normalized by the thickness confirmed in step S604, it is possible to convert, for example, a thickness 702d of the stereoscopic image 702 into a print thickness. Note that the CPU 101 selects no already selected divided region.

In step S610, the CPU 101 reads out the maximum print size of the printing apparatus from the memory 103, and determines whether the print thickness converted in step S609 exceeds the maximum print thickness designated in step S602. If the print thickness exceeds the maximum print thickness (YES in step S610), the CPU 101 determines that the print thickness is not a printable one, and advances to step S611. If the print thickness is equal to or smaller than the maximum print thickness (NO in step S610), the CPU 101 determines that the print thickness is a printable one, and advances to step S614. When the print thickness is equal to or smaller than the maximum print thickness, the image information indicates a size equal to or smaller than the printable maximum print size in the height and width directions and the distance information indicates a size equal to or smaller than the printable maximum print size in the thickness direction. Thus, it is possible to directly perform conversion into shape data.

The print thickness of each of the stereoscopic images 702 to 705 shown in FIG. 7B is equal to or smaller than the maximum thickness 701d shown in FIG. 7A, and the process transits to step S614. That is, conversion into three-dimensional shape data is possible. When the print thickness exceeds the maximum thickness 701d, the image cannot be printed in that direction, and it is necessary to consider assigning distance information to the longest side in the height or width direction by laying down the three-dimensional image data by 90°, that is, by changing the direction. The print thickness of each of the stereoscopic images 706 and 707 shown in FIG. 7B exceeds the maximum thickness 701d shown in FIG. 7A, and the process transits to step S611.

In step S611, the CPU 101 determines whether the print height and width of the region which has been determined in step S610 to have the print thickness exceeding the maximum print thickness exceed the print size of two sides other than the longest side among the sides in the height, width, and thickness directions of the printing apparatus to be used. If the print height and width of the image exceed the print size of the two sides (YES in step S611), the CPU 101 advances to step S612. If the print height and width of the image are equal to or smaller than the print size of the two sides (NO in step S611), the CPU 101 advances to step S613.

In step S611, it is determined whether the print size of a width 706w and a height 706h of the stereoscopic image 706 shown in FIG. 7B exceeds the maximum thickness 701d and the maximum width 701w other than the maximum height 701h of the longest side shown in FIG. 7A.

Figure 7C:
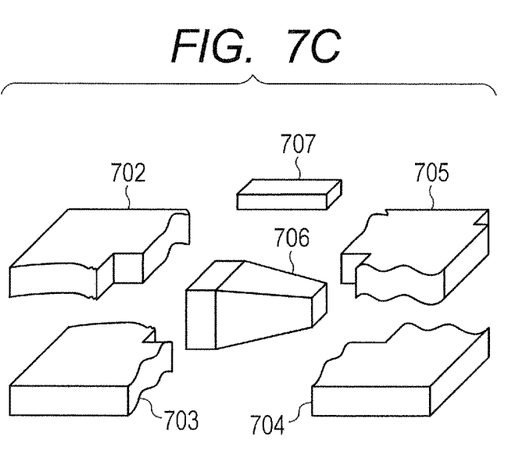
Figure 7D:
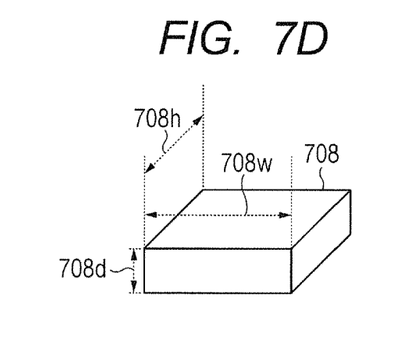
Figure 7E:
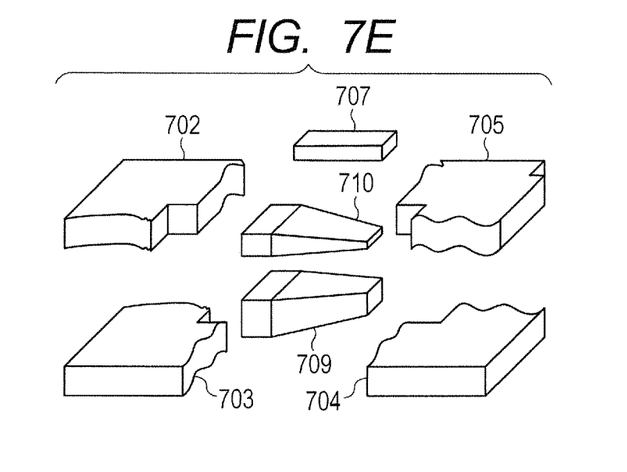

When the print height and width of the image are equal to or smaller than the print size of the two sides other than the longest side, it is possible to convert the three-dimensional image data into printable three-dimensional shape data by laying down the three-dimensional image data by 90°. That is, it is possible to convert the three-dimensional image data into three-dimensional shape data printable by the printing apparatus to be used by laying down the three-dimensional image data by 90°, assigning conversion of the distance information to the longest side, for example, the side in the height direction among the sides in the height, width, and thickness directions, and assigning conversion of the image information to the remaining sides in the width and thickness directions. The height 706h and width 706w as the print size of the stereoscopic image 706 shown in FIG. 7B are equal to or smaller than the printable maximum width 701w and maximum thickness 701d, respectively. That is, the stereoscopic images 706 and 707 shown in FIG. 7B can be printed by the printing apparatus to be used by laying down the image data by 90° and creating three-dimensional shape data, as shown in FIG. 7C.

When the print height and width of the image exceed the print size of the two sides other than the longest side, even if the three-dimensional image data is laid down by 90°, it is impossible to perform conversion into shape data printable by the printing apparatus to be used. A case in which the maximum specifications of the printing apparatus to be used are indicated by a block 708 shown in FIG. 7D will be described. The block 708 shown in FIG. 7D has a print shape thinner than that of the block 701 shown in FIG. 7A. In this embodiment, assume that a maximum width 708w is equal to a maximum height 708h, and a maximum thickness 708d is smaller than the maximum width 708w and the maximum height 708h. Assume also that the maximum width 708w and the maximum height 708h are equal to the maximum width 701w and the maximum height 701h of the block 701, respectively, and the maximum thickness 708d is thinner than the maximum thickness 701d. In the case of these print specifications, the print height and width, that is, the print size of the width 706w and height 706h of the stereoscopic image 706 exceeds the maximum thickness 708d and the maximum width 708w other than the maximum height 708h of the longest side shown in FIG. 7D. Therefore, it is necessary to further perform division so as to execute printing by the printing apparatus complying with the print specifications of the block 708 shown in FIG. 7D.

In step S612, the CPU 101 first performs region subdivision processing preferentially based on the distance features, and then performs region subdivision processing supplementarily based on the image features. The CPU 101 stores the divided three-dimensional data in the memory 103, and returns to step S611. The processing in step S612 is the same as that in step S605. While the determination criteria in step S607 are the height and width of the size in the height, width, and thickness directions of the printing apparatuses, the determination criterion in step S612 is the print size of the two sides other than the longest side of the size in the height, width, and thickness directions.

In step S613, the CPU 101 creates three-dimensional shape data for division printing based on the three-dimensional image data obtained by laying down the divided three-dimensional image data by 90°, and stores the created data in an HDD 102. The image information is moved by 90° and converted into width and thickness coordinates, and the distance information is moved by 90° and converted into a height coordinate. As indicated by the stereoscopic images 706 and 707 shown in FIG. 7C, divided regions laid down by 90° are used to form three-dimensional shape data. If the maximum specifications of the printing apparatus to be used are indicated by the block 708 shown in FIG. 7D, the stereoscopic image 706 shown in FIG. 7C is further divided into stereoscopic images 709 and 710 shown in FIG. 7E, and used to form three-dimensional shape data.

In step S614, the CPU 101 creates three-dimensional shape data for division printing based on the divided three-dimensional image data, and stores the created data in the HDD 102. The image information is converted into height and width coordinates, and the distance information is converted into a thickness coordinate. As indicated by the stereoscopic images 702 to 705 shown in FIG. 7C, the divided regions whose two image directions face upward are used intact to form three-dimensional shape data.

In step S615, the CPU 101 determines whether creation of three-dimensional shape data of all the regions divided up to step S607 has ended. If it is determined that creation of three-dimensional shape data has ended (YES in step S615), the CPU 101 terminates the processing. If it is determined that creation of three-dimensional shape data has not ended (NO in step S615), the CPU 101 returns to step S609.

As described above, in this embodiment, the longest side among the sides in the height, width, and thickness directions of the printing apparatus is assigned to the thickness of the divided region, and region division is performed using the features of the distance information and image information until the height and width of the divided region become those printable by the remaining sides other than the longest side. Even if some three-dimensional image data are printed in the width direction, region division is performed so that a joint is along a broken line such as a ridge, cliff, or valley in the distance information or a portion in which the luminance difference or color difference is large. Consequently, the joint obtained by joining after printing overlaps the three-dimensional structure of a stereoscopic image or the contour of an image, and becomes less conspicuous. This can ensure a large print size in the thickness direction, thereby producing a largest stereoscopic effect.

[Other Embodiments]

The embodiments of the present invention have been explained. However, the present invention is not limited to them. For example, in each of the above embodiments, region division is performed using three-dimensional image data obtained by adding distance information for each pixel to two-dimensional image information. Three-dimensional image data is not limited to this, and three-dimensional image data acquired by various methods are usable. Furthermore, in each of the above embodiments, the three-dimensional image data is divided using color information, luminance information, and distance information for each pixel. However, the three-dimension image data may be divided based on one of the color information, luminance information, and distance information.

The present invention is not limited to a digital single-lens reflex camera or digital compact camera, and is applicable to a digital video camera, a mobile phone, a three-dimensional scanner, and a three-dimensional print data generation device in a computer apparatus.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2015-049544, filed Mar. 12, 2015, and No. 2015-191356, filed Sep. 29, 2015, which are hereby incorporated by reference herein in their entirety.

What is claimed is:

1. A print data division apparatus comprising:
at least one processor or circuit configured to perform the operations of the following units: 'a feature detection unit configured to detect a feature of three-dimensional image data based on pixel information included in the three-dimensional image data;
a division and combination unit configured to divide the three-dimensional image data into a plurality of image data in accordance with a boundary detected based on the feature of the three-dimensional image data and combine a part of the plurality of the divided image data without exceeding a predetermined print size; and
a creation unit configured to create three-dimensional shape data for the divided three-dimensional image data,
wherein the feature detection unit detects distance information corresponding to a distance from an image pickup apparatus which acquires the pixel information to an object as the feature, and
wherein the division and combination unit divides the three-dimensional image data in accordance with the boundary detected based on the distance information.

2. The print data division apparatus according to claim 1, wherein
the pixel information includes color information,
the feature detection unit detects the color information as the feature, and
the division and combination unit divides the three-dimensional image data in accordance with the boundary detected based on the color information.

3. The print data division apparatus according to claim 1, wherein
the pixel information includes luminance information,
the feature detection unit detects the luminance information as the feature, and
the division and combination unit divides the three-dimensional image data in accordance with the boundary detected based on the luminance information.

4. The print data division apparatus according to claim 1, wherein the feature of the distance information is a difference between distances in pieces of distance information of adjacent pixels.

5. The print data division apparatus according to claim 4, wherein the feature of the distance information is a difference between the differences between the distances in the adjacent pixels.

6. The print data division apparatus according to claim 1, wherein
the pixel information includes color information, luminance information, and distance information representing a distance from an image pickup apparatus which acquires the pixel information to an object,
the feature detection unit detects the color information, the luminance information, and the distance information as the features, and
the division and combination unit divides the three-dimensional data in accordance with the boundary detected based on one of the color information and the luminance information, and the distance information, and divides the three-dimensional image data in accordance with the boundary detected based on the other of the color information and the luminance information, and the distance information.

7. A computer-readable storage medium storing a program for causing a computer to execute:
detecting a feature of three-dimensional image data based on pixel information included in the three-dimensional image data;
dividing a region of the three-dimensional image data into a plurality of image data in accordance with a boundary detected based on the feature of the three-dimensional image data and combining a part of the plurality of the divided image data without exceeding a predetermined print size; and creating three-dimensional shape data for the divided three-dimensional image data, wherein distance information corresponding to a distance from an image pickup apparatus which acquires the pixel information to an object is detected as the feature, and wherein the three-dimensional image data is divided in accordance with the boundary detected based on the distance information.

8. A print data division method comprising:

detecting a feature of three-dimensional image data based on pixel information included in the three-dimensional image data;

dividing a region of the three-dimensional image data into a plurality of image data in accordance with a boundary detected based on the feature of the three-dimensional image data and combining a part of the plurality of the divided image data without exceeding a predetermined print size; and creating three-dimensional shape data for the divided three-dimensional image data, wherein distance information corresponding to a distance from an image pickup apparatus which acquires the pixel information to an object is detected as the feature, and wherein the three-dimensional image data is divided in accordance with the boundary detected based on the distance information.

9. The print data division apparatus according to claim 1, wherein the predetermined print size is input from an operation unit by a user operation.

10. The print data division apparatus according to claim 1, wherein a printed size after joining printed materials is input from an operation unit by a user operation.

* * * * *